June 27, 1967  R. G. HULING  3,327,728
PULSATOR USING LIQUID VALVE
Filed June 10, 1964
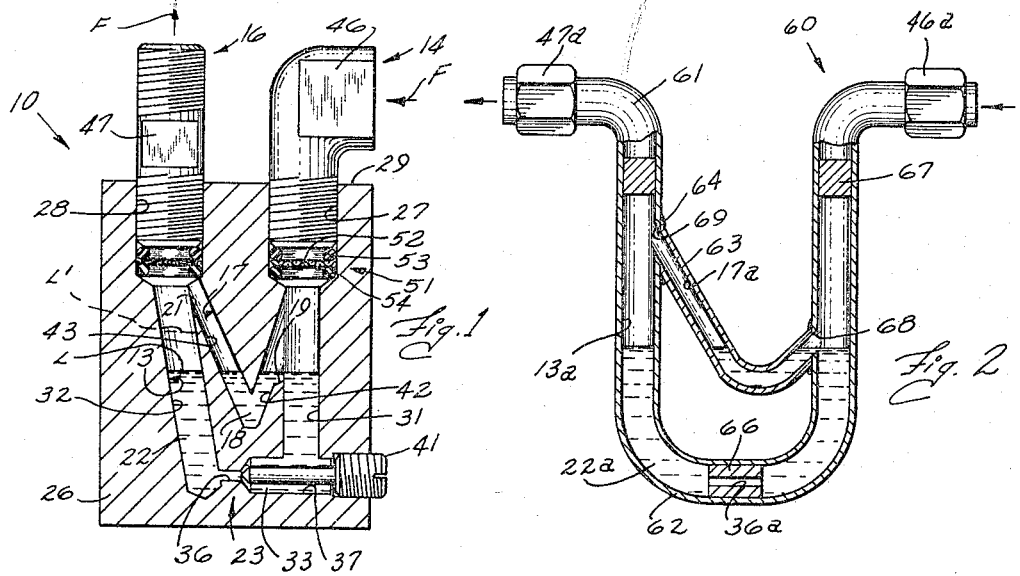
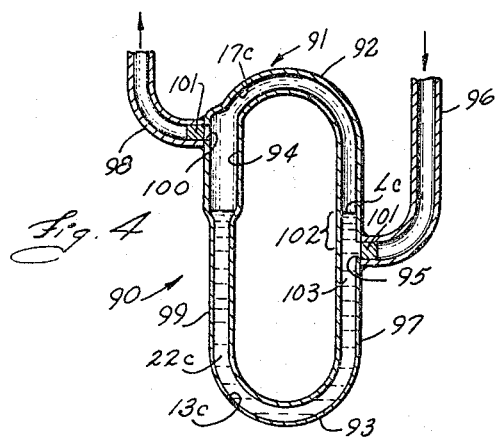
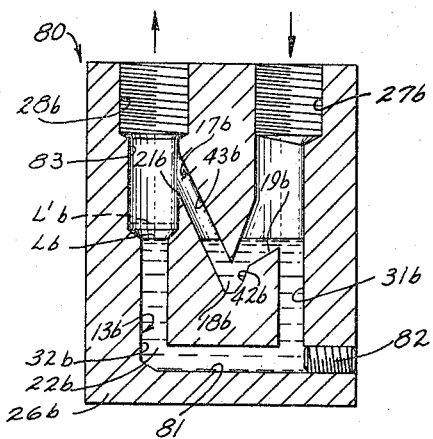
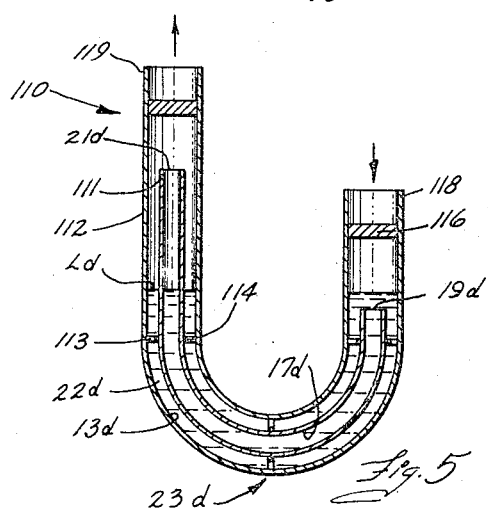
INVENTOR.
ROBERT G. HULING
BY Woodhams, Blanchard & Flynn
ATTORNEYS United States Patent Office 3,327,728
Patented June 27, 1967

3,327,728
PULSATOR USING LIQUID VALVE
Robert G. Huling, Battle Creek, Mich., assignor to S. H. Leggitt Company, Marshall, Mich., a corporation of Michigan
Filed June 10, 1964, Ser. No. 374,093
2 Claims. (Cl. 137—252)

This invention relates to a valve for pulsating a gas flow therethrough and more specifically refers to such a valve operated by displacement of a liquid.

The prior art reveals many valves insertable between a source of gas under pressure and a dissipative load wherein the valve produces a periodically pulsed gas flow to the load. Such valves are used, for example, in pulsing a combustible gas flow to a burner for producing a pulsating gas flame.

Warning lights used in ocean based warning buoys or highway flashers or the like generally operate under difficult conditions involving rough handling and sustained periods of operation without attention or maintenance and must be capable of a high level of reliability in that failure thereof could lead to serious accidents. Thus, the requirements placed on the operation of pulsator valves for such use are understandably severe.

The afore-mentioned prior art valves have exhibited a number of undesirable characteristics, particularly in the more demanding usages such as that mentioned above. Such valves are for the most part mechanically operated and generally include means, such as a diaphragm, against which gas pressure can act and means urging the diaphragm in opposition to the gas pressure. Thus, such mechanical pulsators have stressed and moving parts subject to wear and/or breakage and are thus not as reliable or longlived as might be desired. The construction of such pulsators typically requires substantial machining, some of which is of a close tolerance nature to insure a proper fit of the plurality of parts comprising the pulsating valve and to permit the proper relative motion of the moving parts therewithin. Further, such pulsator valves require a plurality of relatively expensive materials to provide the resistance to frictional wear, flexibility, resiliency, and in some cases resistance to corrosion required. As a result, previous pulsator valves have generally been relatively expensive to produce and to maintain and have often been insufficiently reliable in their operation to be used in many applications.

Accordingly, the objects of this invention include:

(1) To provide a flow controlling valve for compressible fluids capable of delivering an interrupted fluid flow therethrough.

(2) To provide a valve, as aforesaid, capable of producing a pulsed gas flow therethrough upon connection to a pressurized gas source and in which said pulsed gas flow is controlled by a liquid.

(3) To provide a valve, as aforesaid, in which a liquid column blocks gas flow therethrough until the pressure of the gas rises sufficiently to move the liquid column out of the way.

(4) To provide a valve, as aforesaid, capable of monolithic construction, capable of construction without movable mechanical parts and in which only the controlling liquid and the gas to be controlled move therewithin.

(5) To provide a valve, as aforesaid, capable of construction in a wide range of sizes, readily adaptable to means for varying the pulse volume, duration and frequency over wide ranges and which is capable of manufacture in a wide variety of different specific forms and by a wide variety of differing techniques and materials.

(6) To provide a valve, as aforesaid, which is readily adaptable to manufacture singly or in large numbers and which may be readily constructed of commonly available materials with readily available tools, even hand tools, under field conditions.

(7) To provide a valve, as aforesaid, capable of rapidly and positively opening and closing and in which the time required for opening and closing is short compared to the time during which the valve is maintainable in an open or closed position.

(8) To provide a valve, as aforesaid, capable of satisfactory operation when fed by a poorly regulated and/or high pressure gas source and which is readily manufacturable in a form substantially indestructible by high source pressures or large pressure transients.

(9) To provide a valve, as aforesaid, which is readily adaptable to a wide variety of new or existing mechanisms, which is operable efficiently under a wide variety of environmental conditions, which requires substantially no maintenance, which is readily maintained by a relatively unskilled person and which will have a long and substantially trouble-free service life under rugged operating conditions.

Other objects and purposes of this invention will be apparent to persons acquainted with apparatus of this general type upon reading the following specification and inspecting the accompanying drawings.

In the drawings:

FIGURE 1 is a central cross-sectional view of a preferred embodiment of the invention.

FIGURE 2 is a partially broken elevational view of a modified embodiment of the invention.

FIGURE 3 is a central cross-sectional view of a further modification embodying the invention.

FIGURE 4 is a central cross-sectional view of a still further modification embodying the invention.

FIGURE 5 is a central cross-sectional view of a valve apparatus embodying the invention.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

*General description*

In general, the objects and purposes of the invention are met by providing a valve comprising a transfer passage having its ends connected to spaced locations on a return passage. Said spaced locations are vertically elevated above the portion of the return passage lying therebetween. The return passage has an inlet end connectible to a source of compressible fluid, usually a gas, under pressure and the outlet thereof is connectible to a suitable dissipative load. The outlet end of said transfer passage is located above the inlet end thereof. The intermediate portion of the transfer passage is vertically displaced from the zone between the ends thereof. A liquid fills said return and transfer passages to a level between the ends of said transfer passage. Liquid rise in the outlet end of the return tube is maintained below the outlet end of the transfer tube. Increased gas pressure in the inlet end of the return passage pushes the liquid in the transfer passage out the outlet end thereof, whereby to connect said source to said load through said transfer passage. Such connections result in pressure equilization between the ends of the return tube, causing the liquid therein to return to its original level thereby refilling the transfer tube and stopping gas flow.

Detailed description

Turning now to the drawings, FIGURE 1 discloses a preferred embodiment of the pulsator valve 10 embodying the invention. Basically, the valve 10 comprises a substantially upright, generally U-shaped return passage 13 having inlet means 14 and outlet means 16 defining ends thereof. A transfer passage 17 connects with the generally upwardly extending legs of the return passage 13 at vertically spaced points thereon so that the inlet end 19 of the transfer passage 17 is located well below the outlet end 21 thereof. The intermediate portion 18 of the transfer passage 17 is vertically displaced from the zone between said ends 19 and 21 and lies above the bight portion of the return passage 13. Gas passes through the valve 10 in the direction indicated by the arrows F.

A suitable liquid 22 fills said return and transfer passages 13 and 17 to the same level, which level is above the inlet end 19 and below the outlet end 21 of the transfer passage 17 and which level is preferably nearer the inlet end 19 depending on the particular passage geometry employed. The liquid 22 may be of any desired type having characteristics adapted to the gas to be controlled thereby. The liquid 22 is preferably nonreactive, both chemically and physically, with the gas to be handled, preferably has a high surface tension to prevent bubbling of the gas therethrough and is preferably relatively dense. Liquid mercury has been satisfactory for use in the valve 10 with a wide variety of gases including combustible gases such as propane and the like. The following description will therefore assume liquid 22 to be mercury although it is recognized that other liquids may be used as desired and within the scope of the invention.

Control means 23 are preferably, though not necessarily, provided in the return passage 13 to control the rate at which the liquid 22 returns rightwardly toward the inlet means 14.

Considering the valve 10 in detail, said valve includes a generally rectangular block 26 of any convenient, substantially rigid material such as, for example, metal or clear plastic. The openings in the block 26 defining the return passage 13 and transfer passage 17 and the means associated therewith may be formed therein by any of several methods. It has been found, for example, that the passages required may be formed in the block 26 merely by a short series of drilling operations and this method has been found particularly advantageous for constructing the valve 10. Hence, the construction of the valve 10 will be described in terms of said method for purposes of illustrating the preferred embodiment of the invention. Thus, the return passage 13 includes a spaced pair of relatively large diameter recesses 27 and 28 in the top surface 29 of the block 26 for receiving the inlet means 14 and outlet means 16, respectively. A pair of blind openings extend substantially downwardly and are of lesser diameter than the recesses 27 and 28 and comprise the inlet and outlet legs 31 and 32, respectively, of the return passage 13. In the particular embodiment shown, the outlet leg 32 is angled slightly toward the inlet leg 31. The lower ends of the legs 31 and 32 are connected by a passageway 33 including a restrictive orifice 36. The orifice 36 comprises at least a part of the control means 23 utilized in this embodiment of the invention. If desired, the control means 23 may also include an enlarged valve chamber 37 coaxial with the orifice 36 defining the rightward end of the passage 33 and extending through the right side of the block 26. A valve core 41 threadedly engages the rightward end of the valve chamber 37 for adjustment toward or away from the restrictive orifice 36 whereby to impede to a greater or lesser extent flow of the liquid 22 therethrough.

A further pair of openings communicate with the opposed sides of said legs 31 and 32 to define the inlet and outlet legs 42 and 43, respectively, of the transfer passage 17, said legs 42 and 43 meeting at the intermediate portion 18 above the passageway 33 of the return passage 13. Provision of a transfer passage 17 of lesser diameter than the return passage 13 allows the relative height of the outlet leg 32 of the return passage 13 to be reduced and may therefore be desirable in a particular embodiment.

The inlet means 14 includes a threaded elbow fitting 46 threadably received in the upper portion of the inlet recess 27. A conventional fitting 47 is threadably received in the upper portion of the outlet recess 28 and comprises at least a portion of the outlet means 16. In addition said inlet and outlet means 14 and 16 preferably includes between the lower ends the recesses 27 and 28 and of the fittings 46 and 47, respectively, a liquid block 51 which allows substantially free passage of gas therethrough but prevents any passage of liquid therethrough. In the embodiment shown, the liquid block 51 comprises a fine mesh screen 52 extending across each of the recesses 27 and 28 and axially supported between a pair of resilient O rings 53 and 54.

Operation

The pulsator valve 10 is connectible by the inlet fitting 46 to a source (not shown) of gas under pressure. The outlet fitting 47 is connectible to a gas consuming load, such as a flashing, gas burning light, which requires a periodically interrupted gas flow. With the gas pressure in the inlet and outlet legs 31 and 32 equalized, the liquid 22 will be at the same level indicated at L in the legs of both the transfer and return passages 17 and 13 due to communication therebetween at the inlet end 19 of the transfer passage 17. An increase in pressure in the upper portion of the inlet leg 31 drives the liquid level in the inlet legs 31 and 42 downwardly thereby raising the liquid levels in the outlet legs 32 and 43. The level rise in the outlet legs 32 and 43 will be substantially similar at this time, although the level in the return outlet leg 32 may remain somewhat below the rising level in the transfer outlet leg 43 if the passage 33 is overly restricted. In any case, continued entrance of gas through the inlet fitting 46 increases both the gas volume and gas pressure within the inlet legs 42 and 31 and causes the liquid level in the leg 42 to drop toward the intermediate portion 18 of transfer passage 17. Since the transfer passage 17 is less deep than the return passage 13, the inlet leg 42 is drained of liquid while there is still liquid in the inlet leg 31.

The diameter of the transfer passage 17 is sufficiently small that the surface tension of the liquid 22 will prevent bubbling of the gas therethrough and, as a result, the liquid 22 is moved therethrough substantially as a unitary "plug." A continuously increasing pressure is required to maintain movement of the liquid 22 through the transfer passage 17 before the level thereof in the inlet leg 42 reaches the intermediate portion 18 because of the continuously increasing difference in the height of the liquid columns in the legs 42 and 43. On the other hand, as the gas forces the trailing end of the liquid plug contained in the transfer passage 17 past the intermediate portion 18, there is no longer a liquid column in inlet leg 42 and entrance of further gas into the inlet means 14 will tend to increase the gas volume in the transfer passage 17 rather than to increase the gas pressure in inlet legs 31 and 42. The upper end of the liquid plug, in the present embodiment of the invention, is spaced below the upper end 21 of the transfer outlet leg 43 when the lower end of said plug is at the portion 18. The liquid level in the return leg 31 is spaced below the transfer outlet 21 at this time as indicated in broken lines at L'. The continued entrance of gas into the valve causes the plug of liquid 22 to rise in the transfer outlet leg 43 while the level of liquid 22 in the return outlet leg 32 remains substantially stationary. The rising liquid plug eventually reaches the outer end 21 of the transfer chamber 17 and overflows into the return chamber leg 32. The leg 32 is sufficiently wide as to allow gas between the overflowing plug and the quiescent liquid level L' already in the leg 32 to escape upwardly past the falling plug. The volume of the return outlet leg 32 above the level L' and below the outlet end 21 is sufficient to fully receive the plug of liquid 22 overflowing thereinto. Hence, as gas reaches the outlet end 21 of the transfer passage 17 the liquid 22 no longer blocks movement thereof outwardly through the outlet fitting 47. Such passage of gas through the transfer passage 17 substantially instantaneously equalizes the pressure on the liquid 22.

As a result of such pressure equalization, the difference in liquid column heights in the legs 31 and 32 can no longer be supported and the excess liquid 22 in the outlet leg 32 will flow back through the restrictive orifice 36 into the inlet leg 31. Because of the orifice 36 and valve 41 if same is provide, such backflow will take a non-zero time interval during which gas is free to travel through the open transfer passage 17 from the inlet fitting 46 to the outlet fitting 47. Hence, the size of the restrictive orifice 36 and the setting of the valve 41 will determine the length of time during which gas flows through the valve 10 after said pressure equalization and hence can determine pulse length and shape. Omission of the restrictions provided by the orifice 36 and valve 41 tends therefore to produce gas pulses of short duration and small gas content. As the liquid level in the leg 31 rises past the point 19 liquid will begin to enter the transfer passage 17 and will tend to assume the original level L shown in FIGURE 1 depending upon the rate of gas pressure build-up in the upper end of the inlet leg 31.

If desired, an adjustable valve, not shown, may be provided between the inlet fitting 46 and said source of gas under pressure to slow the passage of gas into an upper end of the inlet leg 31. Provision of such a valve will allow control of the time during which the valve 10 blocks gas flow therethrough. Similarly, a valve may be provided between the outlet fitting 47 and the load connected thereto for controlling the rate of flow of gas out of the upper end of the outlet leg 32. Such a valve will, with the restrictive orifice 36 and valve 41, control the gas pulse length. Pulse frequency is readily adjusted with or without the addition of such valve when the valve 41 is provided. When no valves are provided and restriction of flow through the return passage 13 is regulated only by the restrictive orifice 36 the pulsing characteristics of the valve 10 are still pre-selectable by control of the size of the orifice 36 during manufacture.

Provision of the screens 52 allows tipping of the valve 10 without loss of the liquid 22 and allows the valve 10 to be transported while filled and to be used in a movable apparatus without materially affecting the operation thereof.

It has been found that a valve such as the valve 10 may also be constructed from a pair of blocks having grooves corresponding to the passages 13 and 17 and the other openings hereinabove desscribed formed in a face of one or both thereof. The grooved faces of the blocks are tightly affixed to each other so that said grooves define said passages 13 and 17 as well as the aforementioned other openings in a leakproof manner. Plastic, for example, transparent plastic, may be used for such blocks and said grooves may be formed, for example, by heating said plastic blocks to a softened condition and thereafter impressing a die having outstanding parts corresponding to said grooves thereagainst and thereinto. Said plastic blocks may be advantageously affixed to each other by welding or the like to obtain a rigid and leakproof finished valve.

*Modification of FIGURE 2*

The pulsator valve 60 disclosed in FIGURE 2 is substantially in basic organization and in operation to the valve 10 of FIGURE 1. Thus, portions of the valve 60 corresponding to portions of the valve 10 will carry the same reference numerals with the suffix *a* added thereto and need not be further described in detail.

However, the valve 60 differs from the valve 10 in the manner in which it is constructed. More specifically, the valve 60 differs from the valve 10 in that it comprises a substantially U-shaped main conduit 61 and includes a bight portion 62 normally being located below the rest of said conduit 61. A secondary conduit 63 communicates between vertically spaced points on the main conduit 61 and lies above the bight portion 62 thereof.

The main conduit defines the return passage 13a and the secondary conduit 63 defines the transfer passage 17a in communication with the return passage 13a. The conduits 61 and 63 may be of any substantially rigid material capable of being bent and readily fastened together such as, for example, stainless steel (if mercury is used as the liquid), copper or glass tubing. When the conduits 61 and 63 are of stainless steel tubing, the connections therebetween may be welded as indicated at 64. The restrictive orifice 36a within the conduit 61 is provided in suitable plug 66 located in the bight portion 62. Suitable inlet and outlet fittings 46a and 47a are located on the ends of the main conduit 61 for engagement thereof with a source of gas under pressure and a load, respectively. The screens 52 used in the valve 10 to prevent overflow of liquid are conveniently replaced in the valve 60 by porous plugs 67 located in the conduit 61 above the ends of the conduit 63. The plug 67 may be of any convenient construction capable of passing a gas therethrough with relatively little restriction and capable of preventing flow of the liquid 22a within the tubes 61 and 63 therethrough. In a preferred embodiment of the invention, such plugs were of sintered stainless steel. The valve 60 is conveniently constructed by insertion of the plugs 66 and 67 into the conduit 61 while said conduit is still in a straight condition, and after suitable holes 68 and 69 are cut therein for allowing communication between the transfer passage 17a and return passage 13a. Thereafter, the conduit 61 may be bent into the desired U-shaped configuration and the tube 63 fixed thereto. The remaining physical arrangement of the valve 60 and the operation thereof is substantially similar to that of the valve 10 and hence needs no further description.

*Modification of FIGURE 3*

FIGURE 3 discloses a modified valve structure 80 and is substantially similar to the valve 10 of FIGURE 1 with the several exceptions noted hereinbelow. Thus, parts of the valve 80 substantially similar to corresponding parts of the valve 10 will be designated by the same reference numerals but with the suffix *b* added thereto. Parts and operation of the valve 80 will be considered similar to corresponding parts and the operation thereof of the valve 10 unless otherwise specifically noted hereinbelow. The valve 80 is similar to the valve 10 in that it is readily made, for example, by the drilling of a plurality of holes in a block 26b. The legs 31b, 32b, 42b and 43b of the valve 80 are arranged in an orientation differing slightly from the corresponding legs of the valve 10 to illustrate the versatility of layout possible with this method of construction.

The restrictive orifice 36, valve member 37 and valve 41 comprising the control means 23 of the valve 10 are omitted from the valve 80. In the valve 80, the lower ends of the legs 31b and 32b are connected by a bight passage 81 of cross-sectional area comparable to that of the legs 31b and 32b and which does not substantially restrict the flow of the liquid 22b therethrough. In the particular embodiment shown, the bight passage 81 may be formed by drilling an opening through the right side of the block 26b and the rightward end of said hole may be blocked by a threaded plug 82 to prevent an escape of fluid therethrough. The valve 80 may be supplied with a restrictive valve or orifice in the bight passage 81, if desired. However, such is not required and is not shown here.

The valve 80 includes modified means for maintaining the level of liquid 22b in the outlet leg 32b of the return passage 13b below the outlet end 21b of the transfer passage 17b. More specifically, the portion of the outlet leg 32b above the initial liquid level $L_b$ is of substantially increased diameter to form a reservoir 83. Since the cross-sectional area of the reservoir 83 is considerably larger than the area of the passages 31b and 32b, a relatively large drop in the liquid level in leg 31b due to gas pressure will cause only a relatively small liquid level rise in the reservoir 83. The same gas pressure condition acting on liquid in the transfer chamber 17b will cause a moderate level drop in the leg 42b accompanied by a level rise in the leg 43b of similar magnitude, the difference in levels in the return passage 13b being equal to the difference in transfer passage 17b under quasi-static operating conditions. Thus, as the liquid levels in the outlet legs 32b and 43b continue to rise, the level in the transfer outlet leg 43b rises above the level in the return outlet leg 32b.

Since the liquid level in the return outlet leg rises only for outlet leg 43b, the initial liquid level may be set above the illustrated level $L_b$ so that the plug of the liquid in the illustrated level $L_b$ so that the plug of the liquid in the transfer passage 17b will begin to overflow into the reservoir 83 before the transfer inlet leg 42b empties. In otherwise similar valves, then, provision of a reservoir such as the reservoir 83 allows a higher initial liquid level, hence, a greater maximum level difference in each of the passages 13b and 17b and, as a result, a higher maximum gas pressure.

Of course, the reservoir must have sufficient volume between the maximum level $L'_b$ achieved therein due to the gas pressure differential in the valve and the outlet opening 21b to wholly receive the plug of liquid 22 from the transfer passage 17.

Again as in the case of the valve 10, the gas pressure substantially maximizes as the trailing end of the plug passes the point 18b so that additional gas entering the valve 30 causes the plug of liquid 22b to overflow from the leg 43b into the reservoir 83. Once overflow has started and after the plug leaves the inlet leg 42b, the decreasing plug length allows the plug to move more rapidly out of the transfer outlet leg 43b and the gas moving same escapes through the upper end of the reservoir 83. After the gas escapes and pressure is equalized between the reservoir 83 and the upper end of the leg 31b, the liquid level $L_b$ is relatively quickly resumed in the return and transfer passages 13b and 17b due to the relatively unrestricted flow of excess liquid 22b in the reservoir 83 out thereof through the legs 31b and 32b and passage 81. Said unrestricted flow of liquid allows a rapid shut-off of gas flow after pressure is equalized. Again, as in the case of the valve 10 of FIGURE 1, suitable valve means may be connected to the inlet and outlet recesses 27b and 28b, if desired, to selectively slow the rate of gas delivery to the valve 80, reduce the frequency of operation thereof and/or broaden the pulses of gas flowing through said valve 80.

It will be noted the rightward or inlet end 19b of inlet leg 42b of the valve 80 is substantially funnel shaped, having sides which converge toward the midportion 18b of the transfer passage 17b. Such a construction may be desirable in certain cases in that it allows a greater liquid plug length without increasing the initial liquid level $L_b$ than would a cylindrical inlet leg. Such a greater plug length in turn, allows a larger charge of gas to pass through the valve 80 during each cycle and thus tends to slow the cycling frequency of the valve. The inlet end 19 of the transfer passage 17 (FIGURE 1) is shown for purposes of illustration to include a much smaller funnel-shaped portion which may be omitted if desired.

*Modification of FIGURE 4*

The valve 90 of FIGURE 4 is similar to the valve 80 of FIGURE 3 above described in that the return passage 13c thereof contains no restrictive devices. However, the valve 90 differs from the valve 80, for example, in the orientation of its transfer chamber 17c and therefore in its manner of poeration as well as in the manner in which it is constructed. More specifically, the valve 90 comprises a closed loop 91 of tubing or the like. The loop 91 may be constructed of any preferably bendable material having a substantially rigid character such as steel, copper, glass or plastic tubing. The loop 91 may be of any desired shape and orientation so long as one portion 92 thereof is raised above another portion 93 thereof as shown. An inlet tube 96 is connected to the inlet side 97 of the loop 91 and is in communication therewith through an opening 95 located between the upper end 92 and lower end 93 of the loop 91. An outlet tube 98 is connected to the outlet side 99 of the loop 91 through an opening 100 located between the upper end 92 and lower end 93 thereof. The inlet opening 95 is located below the outlet opening 100. The outlet side 98 of the loop 91 is preferably of enlarged diameter in a portion 94 adjacent and below the outlet opening 100. The inlet tube 96 and outlet tube 98 preferably have suitable liquid blocking, gas passing means such as the sintered stainless steel plugs 101 to prevent escape of liquid 22c from the loop 91 therepast.

Portions of the valve 90 corresponding to portions of the valve 10 of FIGURE 1 will be referred to by the same reference numerals with the suffix c afixed thereto. The upper portion 92 of the loop 91 above the tubes 96 and 98 defines a gas transfer passage 17c and broadly comparable to the transfer passage 17 of valve 10 and, similarly, the portion 93 of the loop 91 below said tubes 96 and 98 defines a liquid return passage 13c broadly similar to the return passage 13 of the valve 10 or to the passage 13b of the valve 80 of FIGURE 3. The loop 91 contains a liquid 22c, the upper surface of which is normally located at the level $L_c$ spaced above the inlet opening 95, below the lower end of the outlet opening 100 and preferably located within the enlarged portion 94.

Considering the operation of the valve 90, gas pressure applied through the inlet tube 96 passes through the plug 101 and forms a bubble in the inlet opening 95. Continued gas flow enlarges this bubble until it separates a quantity 102 of liquid comprising that part of the liquid 22c normally lying approximately above the center of the opening 95. As gas continues to enter the opening 95 from the inlet tube 96 the quantity 102 of liquid is moved upwardly thereby toward the upper end 92 of the loop 91. The level of the liquid in the outlet side 99 of the loop 91 is not materially disturbed as long as no rapid changes are made in the system since the downward static force exerted upon the liquid portion 103 below the opening 95 is substantially the same whether it is exerted by the quantity 102 of liquid or by the gas pressure in the gas bubble at the opening 95 which supports the quantity 102 of liquid. If the quantity 102 of liquid is small relative to the total body of liquid 22c, gas pressure transients will be largely absorbed by movement of the quantity 102 and the effect of such transients on the level of the liquid 22c in the outlet side 99 of the loop 91 will be negligible. With continued feeding of the gas, the quantity 102 of liquid is moved over the top of the loop 91 and falls downwardly past the outlet opening 100 to allow free passage of gas from the upper end 92 and inlet 101 out the outlet 100. In the particular embodiment shown, gas is prevented from being trapped between the quantity 102 of liquid and the surface of the liquid in the outlet side 99 by the increased diameter of the enlarged portion 94 which is too large to be blocked by the quantity 102. When the quantity 102 of liquid passes the outlet opening 101, the gas pressure on the upper surfaces of the liquid in the inlet side 97 and the outlet side 99 of the loop 91 is once again equalized. Such equalization of pressure results in equalization of liquid levels at the original level $L_c$ thereby closing the inlet opening 95. Continued supply of gas to the inlet tube 96 will restart the cycle in the above-described manner. Suitable valving of the type described hereinabove with respect to the valve 10 may be employed on the inlet and outlet tubes 96 and 98 to enable adjustment of the pulsing characteristics of the valve 90.

*Modification of FIGURE 5*

FIGURE 5 discloses a pulsator valve 110 in which the flow of a liquid 22d in a return passage 13d is restricted by any convenient control means 23d somewhat in the manner of the embodiments of FIGURES 1 and 2. The valve 110, however, requires such a restriction in the return passage 13d in order to operate which the hereinabove-discussed valves do not.

Considering the construction of the valve 110 more specifically, same consists of a telescoped pair of centrally U-shaped conduits, inner conduit 111 having an outside diameter smaller than the inside diameter of the outer conduit 112 to form a substantially annular return passage 13d therebetween. The inner conduit 111 defines a transfer passage 17d therewithin. The tubes 111 and 112 may be of any desired material, for example, each embodiment providing a copper outer conduit 112 and an inner conduit 111 of a construction capable of retaining its cross section during bending without additional support. The valve 110 may be built in a variety of ways as by bending the tubes together in a telescoped condition or by at least partially bending same separately and thereafter telescoping same for further bending. In the particular embodiment shown, a plurality of spacers 113, here three are disposed along the length of the inner tube 112 for firmly holding same in position within the outer tube 112. The spacers 113 each has openings 114 therethrough for allowing liquid flow therepast. The inner tube 111 has its input end 19d spaced below its output end 21d and the ends of the outer tube 112 are spaced above said ends 19d and 21d. Further, suitable liquid retaining and gas passing elements, such as the sintered metal plugs 116, are preferably inserted in the ends of outer tube 112 to prevent escape of liquid therepast. A liquid 22d fills the inner and outer tubes 111 and 112 to a normal level $L_d$ above the inlet end 19d of the inner tube 111 and below the outlet end 21d thereof. The inlet end 118 of the outer tube 112 is connectible to a suitable source of gas under pressure and the outlet end 119 of the outer tube 112 is connectible to a suitable dissipative load.

Operation of the valve 110 requires the spacers 113 to restrict the flow rate of liquid 22d therepast sufficiently to allow gas pressure in the inlet end 118 to force the liquid 22d within the transfer chamber 17d out the outlet end 21d thereof before the liquid in the return chamber 13d rises to a level near said outlet end 21d. On the other hand, the openings 114 must allow backflow of liquid 22d from the output side of the outer conduit 112 after the liquid in the transfer passage 17d discharges and equalizes the pressure in the inlet and outlet ends 118 and 119 of the valve 10. Such backflow raises the liquid level in the inlet side of the valve 110 past the inlet end 19d of the transfer passage 17d to again close same to free gas flow therethrough.

The valve 110 may be simplified and reduced in cost when the pulsing characteritsics thereof need not be precisely reproduceable from sample to sample by omitting the spacers 113. The conduits 111 and 112 may be held together in any convenient, not necessarily coaxial, manner as by telescoping same before bending and allowing the resilient pressure exerted by the inner conduit upon the outer conduit during bending to maintain said conduits in a fixed position with respect to each other. It will be apparent that such construction is at once easily fabricated with or without tools and will require minimum manufacturing expenditure.

Although particular preferred embodiments of the invention have been disclosed hereinabove for illustrative purposes, it will be understood that variations or modifications thereof which lie within the scope of the appended claims are fully contemplated.

What is claimed is:

1. A pulsator valve for controlling gas flow therethrough, comprising in combination:
   a valve block;
   a generally U-shaped return passage in said valve block having substantially upstanding legs and a bight portion connecting the bottoms of said legs;
   a transfer passage in said valve block connected between said legs and having an inlet end located below the outlet end thereof and an intermediate portion located below said ends thereof and above said bight portion;
   a liquid in said return and transfer passages filling same to a point above the inlet end of said transfer passage and below the outlet end thereof;
   plug means at the ends of said return passage capable of admitting gas flow therethrough but preventing flow of said liquid therethrough to prevent escape thereof from said valve.

2. The pulsator valve defined in claim 1 including a restrictive orifice and a flow control valve located in said return passage for adjustably controlling the rate of liquid flow therepast.

References Cited

UNITED STATES PATENTS

| | | | |
|---|---|---|---|
| 1,127,387 | 2/1915 | Alger | 137—247.29 X |
| 1,243,604 | 10/1917 | Honeywell | 137—254 X |
| 2,174,203 | 9/1939 | Ducellier et al. | 137—254 X |
| 2,967,540 | 1/1961 | Diehl | 137—253 |
| 3,237,637 | 3/1966 | Ainsworth | 137—251 |

FOREIGN PATENTS

| | | |
|---|---|---|
| 262,549 | 10/1925 | Great Britain. |
| 889,797 | 12/1957 | Great Britain. |

WILLIAM F. O'DEA, *Primary Examiner.*

D. H. LAMBERT, *Assistant Examiner.*